United States Patent [19]
Waldron et al.

[11] Patent Number: 5,756,214
[45] Date of Patent: May 26, 1998

[54] RELEASE FILM COMPRISING POLYCARBONATE-SILICONE-URETHANE RESIN

[75] Inventors: Roger Waldron, Guisborough; Gary Victor Rhoades, Eaglescliffe; John Francis, Levendale, all of England

[73] Assignee: Imperial Chemical Industries PLC, London, England

[21] Appl. No.: 458,016

[22] Filed: Jun. 1, 1995

Related U.S. Application Data

[63] Continuation of Ser. No. 918,797, Jul. 27, 1992, abandoned, which is a continuation of Ser. No. 571,159, Aug. 23, 1990, abandoned.

[30] Foreign Application Priority Data

Sep. 4, 1989 [GB] United Kingdom .............. 8919918

[51] Int. Cl.$^6$ .......................... B32B 27/40; B05D 3/02
[52] U.S. Cl. .......... 428/423.1; 427/155; 427/171; 427/173; 427/387; 427/385.5; 427/393.5; 428/423.7; 428/447; 428/448; 428/910
[58] Field of Search .................. 428/423.1, 423.7, 428/447, 448, 480, 910; 427/155, 171, 172, 173, 372.2, 384, 387, 393.5, 385.5; 264/134

[56] References Cited

U.S. PATENT DOCUMENTS

| | | | |
|---|---|---|---|
| 3,997,701 | 12/1976 | Ealding et al. | 428/341 |
| 4,364,885 | 12/1982 | Kanai et al. | 264/134 |
| 4,388,258 | 6/1983 | Hungerford | 264/129 |
| 4,746,683 | 5/1988 | Kilgour | 521/112 |
| 4,755,337 | 7/1988 | Takahashi et al. | 264/134 |
| 4,775,593 | 10/1988 | Heberger et al. | 428/411.1 |
| 4,980,108 | 12/1990 | Suzuki et al. | 264/134 |
| 5,082,704 | 1/1992 | Higgins | 428/40 |
| 5,082,824 | 1/1992 | Rhoades et al. | 503/227 |
| 5,102,734 | 4/1992 | Marbrow et al. | 428/349 |
| 5,137,961 | 8/1992 | Goos et al. | 524/457 |

FOREIGN PATENT DOCUMENTS

| | | |
|---|---|---|
| 0342826 | 11/1989 | European Pat. Off. |
| 56-11980 | 2/1981 | Japan |
| 1126389 | 11/1987 | Japan |
| 62-292412 | 12/1987 | Japan |
| 63-120641 | 6/1988 | Japan |

*Primary Examiner*—H. Thi Le
*Attorney, Agent, or Firm*—Pillsbury Madison & Sutro LLP

[57] ABSTRACT

A release film comprises a polymeric film substrate and a polymeric abherent layer. The abherent layer comprises a polyurethane resin which is the reaction product of:
(i) an organic polyisocyanate,
(ii) an isocyanate-reactive polydialkylsiloxane, and
(iii) a polymeric polyol.

8 Claims, 1 Drawing Sheet

RELEASE FILM COMPRISING POLYCARBONATE-SILICONE-URETHANE RESIN

This is a continuation of application Ser. No. 07/918,797, filed on Jul. 27, 1992, which was abandoned upon the filing hereof which is a continuation of Ser. No. 07/571,159, filed Aug. 23, 1990, now abandoned.

BACKGROUND OF THE INVENTION

This invention relates to a release film and to a method for the production thereof.

DESCRIPTION OF THE PRIOR ART

Abherents or release agents are generally solid or liquid film-forming materials employed to reduce or prevent adhesion between two surfaces. They are employed in a variety of industrial processes, including metal casting, food preparation and packaging, polymer processing and paper coating, and in the production of moulded resin articles, stamping foils and pressure-sensitive adhesive tapes. Typical abherents include natural and synthetic waxes, metal salts of fatty acids, particularly stearic acid, and polymers, such as polyvinylalcohols, polyamides and polyolefins.

An abherent is conveniently employed in association with a polymeric support film. For example, GB-A-1590592 discloses a mould release foil, suitable for use in the production of moulded articles from a curable resin, the foil comprising a self-supporting thermoplastics film coated on one or both surfaces with a continuous release layer formed from an interpolymer of styrene or a derivative thereof with a film-forming comonomer, such as acrylic acid, methacrylic acid or an alkyl ester thereof.

Similarly, U.S. Pat. No. 4,447,500 discloses a release composition for asphalt roofing materials, such as asphalt shingles and asphalt roll roofing, the composition comprising a mixture of fatty acid monoalkanolamides, such as the monoethanolamides of stearic acid and coconut fatty acid. The composition is suitably provided on the outer surface of a plastics release tape bonded to the underside of the shingle sheet material and positioned to engage with an adhesive strip on an adjacent shingle when the shingles are assembled into a stack.

When associated with a supporting film substrate an abherent must satisfy apparently conflicting criteria, by bonding firmly to the film substrate while providing easy and complete release from an opposing surface. Silicones, based on a silicon-oxygen polymer backbone with pendant aliphatic or aromatic carbon side chains, have assumed importance as abherents in recent years, and generally confer excellent release characteristics. However, with such materials it has proved difficult to achieve adequate adhesion to the film substrate. Furthermore, such materials, when applied to a film substrate during production thereof are frequently liable to evolve siliceous debris, which not only constitutes a health hazard, possibly necessitating the wearing of dust masks and protective clothing by plant operatives, but also, and importantly, severely contaminates the film production line and renders it unsuitable for the subsequent production of alternative film grades. Such debris are also detrimental to the performance of any adhesive medium which may be associated with the film structure.

SUMMARY OF THE INVENTION

We have now devised an improved release film which eliminates or substantially overcomes the aforementioned problems.

Accordingly, the present invention provides a release film comprising a self-supporting, polymeric film substrate having on at least one surface thereof, a polymeric abherent layer wherein the abherent layer comprises a polyurethane resin which is the reaction product of:
(i) an organic polyisocyanate,
(ii) an isocyanate-reactive polydialkylsiloxane, and
(iii) a polymeric polyol.

The invention further provides a method of producing a release film comprising applying an abherent medium to at least one surface of a self-supporting, polymeric film substrate, the abherent medium being applied before, during or after, any stretching operation employed to effect molecular orientation of the film substrate, and drying the applied medium to form a polymeric abherent layer, wherein the abherent medium comprises a dispersion of a polyurethane resin which is the reaction product of:
(i) an organic polyisocyanate,
(ii) an isocyanate-reactive polydialkylsiloxane, and
(iii) a polymeric polyol.

By a "self-supporting film" is meant a film capable of independent existence in the absence of a supporting base.

DESCRIPTION OF PREFERRED EMBODIMENTS

The organic polyisocyanate component of the polyurethane release medium may be an aliphatic, cycloaliphatic, araliphatic or aromatic polyisocyanate. Examples of suitable polyisocyanates include ethylene diisocyanate, 1,6-hexamethylene diisocyanate, isophorone diisocyanate, cyclohexane-1,4-diisocyanate, 4-4'-dicyclohexylmethane diisocyanate, p-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates may be used and also polyisocyanates which have been modified by the introduction of urethane, allophanate, urea, biuret, carbodiimide, uretonimine or isocyanurate residues.

The isocyanate-reactive polydialkylsiloxane may be mono-functional, but conveniently comprises at least two isocyanate-reactive groups.

Polydialkylsiloxanes in which the alkyl group contains from 1 to 6 carbon atoms, particularly a methyl group, and having at least two isocyanate-reactive groups are known. These include polydimethylsiloxanes having two or more reactive groups selected from hydroxy, mercapto, primary amino, secondary amino and carboxy groups. The polydialkylsiloxane may be linear, for example a diol having a hydroxy group at each end, or it may be branched, having three or more isocyanate-reactive groups which may be situated at the various ends of the molecule or may all be located at one end.

Examples of suitable polydimethylsiloxanes include diols of the formula:

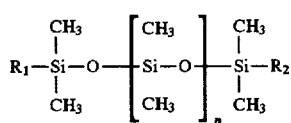

wherein: n is an integer from 0 to 100, preferably from 1 to 50, and more preferably from 10 to 20, and $R_1$ and $R_2$ which may be the same or different, are
—$(CH_2)_y$ $(OX)_z$—OH wherein: X is —CH$_2$—CH$_2$—and/or

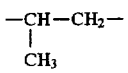

y is an integer of from 2 to 12, preferably 2 to 4, and more preferably 3, and z is an integer of from 0 to 25, preferably 5 to 15, and more preferably 11 or 12, and triols of the formula:

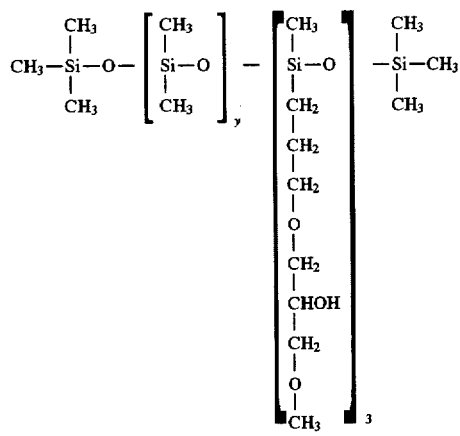

bisphenol A, 1,1-isopropylidene-bis-(p-phenyleneoxy-2-ethanol), commonly known as ethoxylated bisphenol A, or 1,4-cyclohexanedimethanol.

Preferably, the weight average molecular weight of the polymeric polyol is from 700 to 3000.

If desired, the polyurethane release medium may also comprise one or more compounds containing a plurality of isocyanate-reactive groups. A suitable additional isocyanate-reactive compound comprises an organic polyol, particularly a short chain aliphatic diol or triol, or mixture thereof, having a molecular weight in the range 62 to 6000 and being free from silicon atoms.

An organic diamine, particularly an aliphatic diamine, may also be included either independently or together with the organic polyol.

A typical release medium in accordance with the invention thus comprises a urethane-silicone polymer including a structure of formula IV:

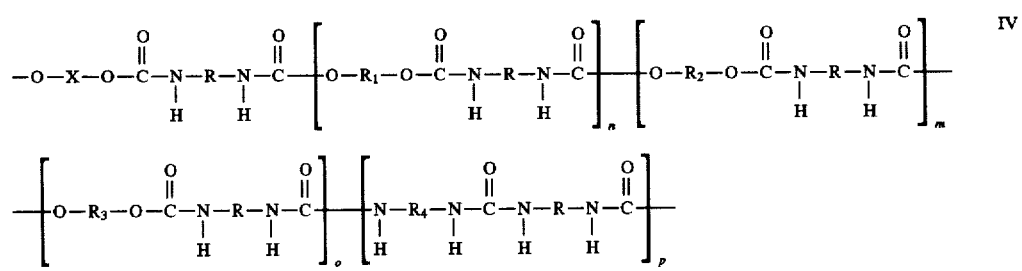

wherein y is an integer from 40 to 150, particularly from 50 to 75.

The polymeric polyol component of the release medium may be a member of any of the chemical classes of polymeric polyols used or proposed to be used in polyurethane formulations. For example, the polymeric polyol may be a polyester, polyesteramide, polyether, polythioether or polyacetal but preferably a polycarbonate—which has a relatively high glass transition temperature (Tg≈140° C.) and confers desirable hardness to the release medium.

Polycarbonates are essentially thermoplastics polyesters of carbonic acid with aliphatic or aromatic dihydroxy compounds and may be represented by the general structural formula:

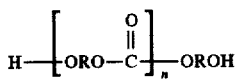

wherein R is a divalent aliphatic or aromatic radical and n is an integer of from 2 to 20. They may be prepared by conventional procedures, such as transesterification of a diester of carbonic acid with an aliphatic or aromatic dihydroxy compound or with mixed aliphatic or aromatic dihydroxy compounds. Typical reactants may comprise 2,2-(4,4'-dihydroxydiphenyl)-propane, commonly known as wherein:

R=a divalent aliphatic and/or cycloaliphatic or aromatic hydrocarbon radical;

X=R$_1$ or R$_2$,

R$_1$=a polycarbonate, polyester or polyether group,

R$_2$=a silicone chain of molecular weight from 500 to 3000,

R$_3$=divalent aliphatic and/or cycloaliphatic hydrocarbon radical,

R$_4$ =divalent aliphatic hydrocarbon radical, optionally containing a carboxyl group, n and m are integers of from 1 to 20, o and p are integers of from 0 to 20.

If desired, a catalyst for urethane formation, such as dibutyltin dilaurate and/or stannous octoate may be used to assist formation of the release medium, and a non-reactive solvent may be added before or after formation of the medium to control viscosity. Suitable non-reactive solvents which may be used include acetone, methylethylketone, dimethylformamide, ethylene carbonate, propylene carbonate, diglyme, N-methylpyrrolidone, ethyl acetate, ethylene and propylene glycol diacetates, alkyl ethers of ethylene and propylene glycol monoacetates, toluene, xylene and sterically hindered alcohols such as t-butanol and diacetone alcohol. The preferred solvents are water-miscible solvents such as N-methylpyrrolidone, dimethyl sulphoxide and dialkyl ethers of glycol acetates or mixtures of N-methylpyrrolidone and methyl ethyl ketone. Other suitable solvents include vinyl monomers which are subsequently polymerised.

The polyurethane resins of the invention are water dispersible, and a release medium comprising an aqueous polyurethane dispersion may be prepared by dispersing the water dispersible, polyurethane resin in an aqueous medium, preferably in the presence of an effective amount of a polyfunctional active hydrogen-containing chain extender.

The resin may be dispersed in water using techniques well known in the art. Preferably, the resin is added to the water with agitation or, alternatively, water may be stirred into the resin.

The polyfunctional active hydrogen-containing chain extender, if employed, is preferably water-soluble, and water itself may be effective. Other suitable extenders include a polyol, an amino alcohol, ammonia, a primary or secondary aliphatic, alicyclic, aromatic, araliphatic or heterocyclic amine especially a diamine, hydrazine or a substituted hydrazine.

Examples of suitable chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, tris (2-aminoethyl) amine, 3,3'-dinitrobenzidine, 4,4'-methylenebis(2-chloroaniline), 3,3'-dichloro-4,4'biphenyl diamine, 2,6-diaminopyridine, 4,4'-diaminodiphenylmethane, menthane diamine, m-xylene diamine, isophorone diamine, and adducts of diethylene triamine with acrylate or its hydrolyzed products. Also materials such as hydrazine, azines such as acetone azine, substituted hydrazines such as, for example, dimethyl hydrazine, 1,6-hexamethylene-bis-hydrazine, carbodihydrazine, hydrazides of dicarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazines such as gamma-hydroxylbutyric hydrazide, bis-semi-carbazide, bis-hydrazide carbonic esters of glycols such as any of the glycols mentioned above.

Where the chain extender is other than water, for example a diamine or hydrazine, it may be added to the aqueous dispersion of polyurethane resin or, alternatively, it may already be present in the aqueous medium when the resin is dispersed therein.

Desirably, the polyfunctional chain extender should be capable of intra-molecular cross-linking, to improve durability and resistance to solvents. Suitable resinous intra-molecular cross-linking agents comprise epoxy resins, alkyd resins and/or condensation products of an amine, eg melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines with an aldehyde, eg formaldehyde. A useful condensation product is that of melamine with formaldehyde. The condensation product may optionally be partially or totally alkoxylated, the alkoxy group preferably being of low molecular weight, such as methoxy, ethoxy, n-butoxy or iso-butoxy. A hexamethoxymethyl melamine condensate is particularly suitable. Another particularly suitable cross-linking agent is a polyaziridine.

Such polyfunctional extenders preferably exhibit at least trifunctionality (ie three functional groups) to promote inter-molecular cross-linking with the functional groups present in the polyurethane resin and improve adhesion of the release medium layer to the receiving layer.

In a preferred emobodiment of the invention the release medium comprises a chain extender and a cross-linking agent.

The chain extension may be conducted at elevated, reduced or ambient temperatures. Convenient temperatures are from about 5° to 95° C. or more, preferably from about 10° to about 45° C.

The amount of chain extender employed should be approximately equivalent to the free-NCO groups in the resin, the ratio of active hydrogens in the chain extender to NCO groups in the resin preferably being in the range from 1.0 to 2.0:1.

A catalyst is preferably introduced into the release medium to accelerate the intra-molecular cross-linking action of the resinuous cross-linking agent and also to accelerate its inter-molecular cross-linking action with cross-linkable functional groups in the polyurethane resin. Preferred catalysts for cross-linking melamine formaldehyde include ammonium chloride, ammonium nitrate, ammonium thiocyanate, ammonium dihydrogen phosphate, diammonium hydrogen phosphate, para toluene sulphonic acid, sulphuric acid, maleic acid stabilised by reaction with a base, ammonium para toluene sulphonate and morpholinium para toluene sulphonate.

If desired, the abherent medium may additionally comprise a surfactant to promote spreading thereof when applied to a film substrate.

The substrate to which an abherent medium is applied to yield a release film according to the invention may be formed from any suitable film-forming, polymeric material. Thermoplastics materials are preferred, and include a homopolymer or copolymer of a 1-olefin, such as ethylene, propylene and but-1-ene, a polyamide, a polycarbonate, and particularly a synthetic linear polyester which may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly aliphatic glycols, eg ethylene glycol, 1,3-propanediol, 1,4-butanediol, neopentyl glycol and 1,4-cyclohexanedimethanol. A polyethylene terephthalate and/or polyethylene naphthalate film is preferred. A polyethylene terephthalate film is particularly preferred, especially such a film which has been biaxially oriented by sequential stretching in two mutually perpendicular directions, typically at a temperature in the range 70° to 125° C., and preferably heat set, typically at a temperature in the range 150° to 250° C., for example—as described in British patent GB-A-838708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4,008,203, particular suitable materials being those sold by ICI PLC under the Registered Trade Mark STABAR. Blends of these polymers may also be employed. A poly p-phenylene sulphide film is also suitable.

Suitable thermoset resin substrate materials include addition-polymerisation resins—such as acrylics, vinyls, bis-maleimides and unsaturated polyesters, formaldehyde condensate resins—such as condensates with urea, melamine or phenols, cyanate resins, isocyanate resins, epoxy resins, functionalised polyesters, polyamides or polyimides.

A film substrate for a release film according to the invention may be unoriented or uniaxially oriented, but is preferably biaxially oriented by drawing in two mutually perpendicular directions in the plane of the film to achieve a satisfactory combination of mechanical and physical properties. Formation of the film may be effected by any process known in the art for producing a polymeric film—for example, a tubular or a flat film process.

In a tubular process simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation.

In the preferred flat film process a film-forming polymer is extruded through a slot die and rapidly quenched upon a chilled casting surface (drum) to ensure that the polymer is quenched to the amorphous state. Orientation is then effected by stretching the quenched extrudate in at least one direction at a temperature above the glass transition temperature of the polymer. Sequential orientation may be effected by stretching a flat, quenched extrudate firstly in one direction, usually the longitudinal direction, ie the forward direction through the film stretching machine, and then in the transverse direction. Forward stretching of the extrudate is conventionally effected over a set of rotating rolls or between two pairs of nip rolls, transverse stretching then being effected in a stenter apparatus. Stretching is effected to an extent determined by the nature of the film-forming polymer, for example—a polyester is usually stretched so that the dimension of the oriented polyester film is from 2.5 to 4.5 its original dimension in the, or each, direction of stretching.

A stretched film may be, and preferably is, dimensionally stabilised by heat-setting under dimensional restraint at a temperature above the glass transition temperature of the film-forming polymer but below the melting temperature thereof, to induce crystallisation of the polymer.

The abherent medium, preferably in the form of an aqueous dispersion, may be applied to a substrate film surface by conventional coating techniques. The applied medium, generally having a solids content of from about 1 to 20% by weight, preferably from about 2 to 10%, and particularly about 3% by weight, is subsequently dried to remove the dispersant and also to effect cross-linking of the polyurethane prepolymer. Drying may be effected by conventional techniques—for example, by passing the coated film through a hot air oven. Drying may, of course, be effected during normal post-formation film-treatments, such as heat-setting.

The abherent coating medium may be applied to an already oriented film substrate. However, application of the coating medium is preferably effected before or during any stretching operation.

In particular, it is preferred according to this invention that the abherent medium should be applied to the film between the two stages (longitudinal and transverse) of a biaxial stretching operation. Such a sequence of stretching and coating is especially preferred for the production of linear polyester release films, such as polyethylene terephthalate films, which are preferably firstly stretched in the longitudinal direction over a series of rotating rollers, coated with the abherent medium and then stretched transversely in a stenter oven, preferably followed by heat-setting.

The reverse surface, remote from the abherent layer, of a release film according to the invention may be untreated or may have thereon a functional layer, such a priming medium, a sealable medium or, particularly, an adhesive composition, such as an asphalt shingle adhesive of the kind normally obtained as a solid, coke-like residue from a petroleum cracking process.

The release films of the invention may conveniently contain any of the agents conventionally employed in the manufacture of polymeric films. Thus, agents such as dyes, pigments, lubricants, anti-oxidants, antistatic agents, surface active agents, gloss-improvers, prodegradants, fire-retardants, and ultra-violet light stabilisers may be incorporated in the substrate and/or abherent coating layer, as appropriate.

The release films may vary in thickness depending on the intended application, but films having a total thickness of from 5 to 250, particularly from 10 to 50 μm are of general utility. The dry thickness of the abherent layer is desirably within a range of from 0.01 to 10, preferably 0.02 to 1.0 μm.

The abherent coatings provided by the invention have low coefficients of friction, excellent wear resistance, and offer effective release from adhesives. They are also characterised by excellent water resistance, low surface tension, excellent retention of low temperature properties and improved lubricity.

Release films according to the invention are of general applicability and may be employed, inter alia, in the production of moulded articles from curable resins.

BRIEF DESCRIPTION OF THE DRAWINGS

The invention is illustrated by reference to the accompanying drawings in which:

Referring to FIG. 1 of the drawings, the film comprises a polymeric substrate layer (1) having an abherent layer (2) bonded to one surface (3) of the substrate.

Figure 1:
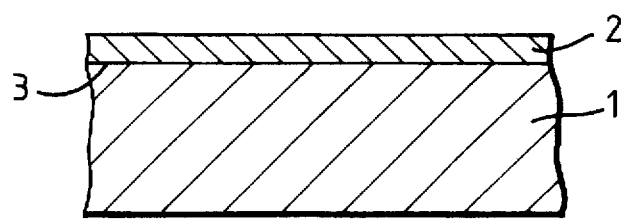
FIG. 1 is a schematic sectional elevation, not to scale, of a polymeric film having a single abherent layer bonded to a substrate layer.
Figure 2:
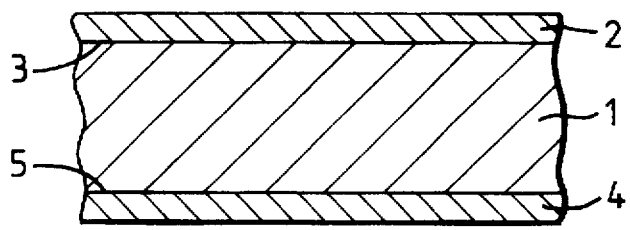
FIG. 2 is a similar schematic elevation of a polymeric film having both surfaces of the substrate coated with an abherent layer.

The film of FIG. 2 additionally comprises a second abherent layer (4) bonded to the second surface (5) of the substrate.

The invention is further illustrated by reference to the following examples.

EXAMPLES 1-5

A molten web of polyethylene terephthalate was extruded in a conventional manner from a slot die on to the polished surface of a cooled rotating drum upon which the web was quenched to below the glass transition temperature of the polymer to provide an amorphous film. The quenched film was then reheated and drawn about 3.5 times its original length in the longitudinal direction at a temperature of about 80° C.

A range of abherent coating media comprising the following compositions was prepared:

| Example No | Permuthane UE-41222 | Synperonic Op 10 | Distilled Water |
| --- | --- | --- | --- |
| 1 | 0.125 Kg | 0.050 Kg | 2.325 Kg |
| 2 | 0.250 Kg | 0.050 Kg | 2.200 Kg |
| 3 | 0.500 Kg | 0.050 Kg | 1.950 Kg |
| 4 | 0.833 Kg | 0.100 Kg | 1.567 Kg |
| 5 | 1.250 Kg | 0.100 Kg | 1.150 Kg |

Permuthane UE-41222 is a polycarbonate-silicone-urethane resin prepared in accordance with the invention, supplied by Permuthane Coatings of Massachusetts, USA. Synperonic OP 10 is an alkyl ethoxylated surfactant supplied by Imperial Chemical Industries PLC.

The aqueous abherent medium was applied to one surface of the uniaxially oriented film by a roller coating technique, the applied wet coat thickness being 2 μm. The coated film was then passed through a hot air oven maintained at a temperature of 95° C. to dry and cure the coating.

The dried film was then drawn about 3.5 times its original width in the transverse direction at a temperature of about 95° C. in a stenter apparatus. Finally, the film was heat set at a temperature of about 200° C.

The resultant release film comprised an abherent layer of about 0.05 μm thickness supported on a biaxially oriented polyethylene terephthalate substrate film of 100 μm thickness.

The release film was heat sealed by uniform pressure at room temperature to Finecal Crossweave Filament-reinforced strapping tape.

Each sample had a sealed area of 25 mm by 25 mm, with an unsealed 'tail' at least 100 mm long. The degree of release was measured by peeling apart each specimen using an 'Instron' A0533 Tensometer at a peel speed of 200 mm min$^{-1}$.

The results are given in Table 1.

EXAMPLE 6

This is a comparative Example not according to the invention.

The procedure of Examples 1–5 was repeated except that the polyethylene terephthalate film was not coated with a release medium. The results are given in Table 1.

EXAMPLE 7

The procedure of Example 1 was repeated except that the abherent coating medium was coated onto a polyethylene naphthalate film instead of polyethylene terephthalate. The results are given in Table 1.

EXAMPLE 8

This is a comparative example not according to the invention. The procedure of Example 7 was repeated except that the polyethylene naphthalate film was not coated with a release medium. The results are given in Table 1.

EXAMPLE 9

A poly p-phenylene sulphide (PPS) film was coated with an abherent coating medium comprising by weight 3% Permuthane UE-41222, 0.2% Synperonic NP 10 and 96.8% water. The coating was dried in an oven at 120–130° C. and the degree of release was measured as described in Examples 1–5. The results are given in Table 1.

EXAMPLE 10

This is a comparative example not according to the invention. The procedure of Example 9 was repeated except that the PPS was not coated with a release medium. The results are given in Table 1.

TABLE 1

| Example No | Peel Strength g/25 mm(Nm$^{-1}$) | |
| --- | --- | --- |
| | Peak | Mean |
| 1 | 2870 (1125) | 1720 (675) |
| 2 | 1500 (588) | 670 (263) |
| 3 | 1630 (639) | 770 (302) |
| 4 | 1740 (682) | 770 (302) |
| 5 | 1650 (647) | 780 (306) |
| 6 (Comparative) | 3200 (1255) | 2090 (820) |
| 7 | — | 420 (165) |
| 8 (Comparative) | — | 485 (190) |
| 9 | — | 354 (139) |
| 10 (Comparative) | — | 657 (258) |

The results illustrate that the abherent coating layer provides good release properties from the strapping tape.

We claim:

1. In a method for preparing an oriented release film comprising a self-supporting, mono-layered polymeric film substrate having directly on at least one surface thereof, a polymeric abherent layer, said method comprising
   (1) providing an aqueous dispersion including a polycarbonate-silicone-urethane resin which is the reaction product consisting essentially of:
      (i) an organic polyisocyanate;
      (ii) an isocyanate-reactive polydialkylsiloxane; and
      (iii) a polymeric polyol which is a polycarbonate derived from 1,4-cyclohexanedimethanol
   (2) applying a layer of said aqueous dispersion directly onto a surface of said substrate after the substrate has been monoaxially oriented;
   (3) drying to form a coating of said polyurethane resin on the monoaxially oriented substrate;
   (4) thereafter further orienting the coated substrate to biaxially orient the same; and
   (5) heat setting the coated biaxially oriented substrate; the polycarbonate-silicone-urethane resin coating being adhered to said substrate while providing the resulting film with release properties without the substantial evolution of siliceous debris in the preparation of the release film.

2. In a method of producing a release film which comprises applying an abherent medium to at least one surface of a self-supporting, mono-layered polymeric film substrate, and drying the applied medium to form a polymeric abherent layer, the improvement which comprises applying directly to the mono-layered polymeric film substrate, as the abherent medium, an aqueous dispersion of a polyurethane resin which is the reaction product consisting essentially of:
   (i) an organic polyisocyanate,
   (ii) an isocyanate-reactive polydialkylsiloxane, and
   (iii) a polycarbonate polyol derived from at least one or more of bisphenol A, ethoxylated bisphenol A and 1,4-cyclohexanedimethanol,
said coating being directly adhered to said substrate while providing the resulting film with release properties without the substantial evolution of siliceous debris in the preparation of the release film.

3. A method according to claim 2 wherein the abherent medium is applied to the polymeric film substrate between the two stages of a biaxial stretching operation.

4. A method according to claim 2 wherein the polycarbonate polyol is derived from 1,4-cyclohexanedimethanol.

5. A method according to claim 2 wherein the abherent medium additionally comprises a polyfunctional active hydrogen containing chain extender.

6. A method according to claim 2 wherein the abherent medium additionally comprises a surfactant.

7. A method according to claim 2 wherein the substrate comprises a polyethylene terephthalate and/or polyethylene naphthalate film.

8. In a method for preparing an oriented release film comprising a self-supporting, mono-layered polymeric film substrate having directly on at least one surface thereof, a polymeric abherent layer, said method comprising (1) providing an aqueous dispersion including a polycarbonate-silicone-urethane resin which is the reaction product of:
      (i) an organic polyisocyanate;
      (ii) an isocyanate-reactive polydialkylsiloxane; and
      (iii) a polymeric polyol which is a polycarbonate derived from 1,4-cyclohexanedimethanol, as the sole polyol component, (2) applying a layer of said aqueous dispersion directly onto a surface of said substrate after the substrate has been monoaxially oriented;

(3) drying to form a coating of said polyurethane resin on the monoaxially oriented substrate;

(4) thereafter further orienting the coated substrate to biaxially orient the same; and (5) heat setting the coated biaxially oriented substrate; the polycarbonate-silicone-urethane resin coating being adhered to said substrate while providing the resulting film with release properties without the substantial evolution of siliceous debris in the preparation of the rerelease film.

* * * * *